(12) United States Patent
Watson et al.

(10) Patent No.: US 10,075,044 B1
(45) Date of Patent: Sep. 11, 2018

(54) AUXILIARY GENERATOR SYSTEM

(71) Applicants: Luke Watson, Sulphur, OK (US); Tommy Thomas, Davis, OK (US)

(72) Inventors: Luke Watson, Sulphur, OK (US); Tommy Thomas, Davis, OK (US)

( * ) Notice: Subject to any disclaimer, the term of this patent is extended or adjusted under 35 U.S.C. 154(b) by 0 days.

(21) Appl. No.: 15/530,843

(22) Filed: Mar. 7, 2017

(51) Int. Cl.
*F02B 63/04* (2006.01)
*F03G 7/08* (2006.01)
*H02K 7/18* (2006.01)
*A01D 34/00* (2006.01)
*A01D 43/00* (2006.01)
*B60K 17/28* (2006.01)
*A01D 101/00* (2006.01)

(52) U.S. Cl.
CPC ......... *H02K 7/1815* (2013.01); *A01D 34/001* (2013.01); *A01D 43/00* (2013.01); *F02B 63/042* (2013.01); *F02B 63/047* (2013.01); *A01D 2101/00* (2013.01)

(58) Field of Classification Search
USPC .................... 290/1 A, 1 R; 180/65.245, 53.5
See application file for complete search history.

(56) References Cited

U.S. PATENT DOCUMENTS

| | | | |
|---|---|---|---|
| 4,870,811 A | 10/1989 | Steele | |
| 6,359,344 B1 | 3/2002 | Klein | |
| 6,604,348 B2 * | 8/2003 | Hunt | A01D 34/008 56/10.2 R |
| 6,675,562 B2 * | 1/2004 | Lawrence | A01D 34/6806 56/16.9 |
| 6,856,035 B2 | 2/2005 | Brandon | |
| 6,948,299 B2 * | 9/2005 | Osborne | A01D 34/006 56/10.8 |
| 6,987,328 B2 * | 1/2006 | Osborne | A01D 34/6806 290/1 A |
| 7,264,069 B2 * | 9/2007 | Fiorenza | A01D 34/77 180/53.7 |
| 7,392,869 B2 | 7/2008 | Carlson | |
| 7,677,017 B2 * | 3/2010 | Holby | A01D 34/82 56/10.6 |
| 8,110,934 B2 * | 2/2012 | Gezel | H02K 7/1815 290/1 R |
| 8,387,729 B2 | 3/2013 | Baumann | |
| 8,521,384 B2 * | 8/2013 | O'Connor | A01G 20/30 701/69 |
| 9,872,438 B2 * | 1/2018 | Eavenson, Sr. | A01D 69/025 |
| 2002/0104300 A1 * | 8/2002 | Hunt | A01D 34/008 56/10.6 |

(Continued)

*Primary Examiner* — Pedro J Cuevas
(74) *Attorney, Agent, or Firm* — Randal Homburg (57) ABSTRACT

A supplemental A/C generator system mounting above a vertical shaft driven rotary engine on a lawn and garden tractor, providing a frame mounted base attaching to the lawn and garden frame defining a platform upon which is mounted an A/C rotary generator providing a lower shaft extension, a connector attaching a rotary engine shaft to an upper shaft of the generator, with a power panel attaching to an outer surface of the generator by a connector plate, the power panel providing a plurality of outlets into which 110 volt and/or 220 volt appliances may be attached, the generator system providing a source of A/C electricity on board the lawn and garden tractor independent from the operation of the lawn and garden tractor.

6 Claims, 6 Drawing Sheets

(56) References Cited

U.S. PATENT DOCUMENTS

| | | | |
|---|---|---|---|
| 2004/0135373 A1* | 7/2004 | Osborne | A01D 34/6806 290/1 A |
| 2015/0224864 A1* | 8/2015 | Schwartz | B60K 6/28 180/65.245 |
| 2016/0105077 A1 | 4/2016 | Stewart | |

* cited by examiner

AUXILIARY GENERATOR SYSTEM

CROSS REFERENCE TO RELATED APPLICATIONS

None.

I. BACKGROUND OF THE INVENTION

1. Field of Invention

A supplemental A/C generator system mounting above a vertical shaft driven rotary engine on a lawn and garden tractor, providing a frame mounted base attaching to the lawn and garden frame defining a platform upon which is mounted an A/C rotary generator providing a lower shaft extension, a connector attaching a rotary engine shaft to an upper shaft of the generator, with a power panel attaching to an outer surface of the generator by a connector plate, the power panel providing a plurality of outlets into which 110 volt and/or 220 volt appliances may be attached, the generator system providing a source of A/C electricity on board the lawn and garden tractor independent from the operation of the lawn and garden tractor.

2. Description of Prior Art

A preliminary review of prior art patents was conducted by the applicant which reveal prior art patents in a similar field or having similar use. However, the prior art inventions do not disclose the same or similar elements as the present auxiliary generator system, nor do they present the material components in a manner contemplated or anticipated in the prior art.

Several prior art device include a generator incorporated within a lawnmower or tractor which provide a portion of the power used to compel the mower or tractor, or supply a conversion mechanism to use the motor to produce electricity to power and compel the mower or tractor. Examples of these type prior art devices include U.S. Pat. No. 7,392,869 to Carlson, U.S. Pat. No. 6,856,035 to Brandon and U.S. Pat. No. 4,870,811 to Steele. Steele provides a gasoline power generator detachably mounting to a mower deriving power from the engine to operate an electrical generator. However, there is no shaft connection, but instead an undisclosed belt which provides power between the engine and generator. Brandon is a system incorporated into the lawnmower to supply power to the mower itself. Carlson discloses a hybrid lawnmower, which uses both mechanical and electric power to compel the lawnmower.

Two incredibly dangerous devices for using a lawnmower to create an electrical power source include U.S. Pat. No. 6,359,344 to Klein and U.S. Patent Publication No. 2016/0105077 to Stewart. Klein is a box upon which a self-propelled motor sits, with the rear drive wheel spinning a wheel on the box to provide rotation to a generator. Stewart is a device which generators power by attaching a platform below the deck of the mower with a blade engaging member attached to a blade member pulley, with a belt connecting the blade member pulley to a generator pulley causing a rotation of the generator to provide auxiliary electrical power attached to a power outlet. It appears that the electrical output of these devices pale in comparison to the risk to the user in losing one of several body parts during operation.

Baumann, U.S. Pat. No. 8,387,729, discloses a horizontally mounting generator drive coupling that inhibits transmission of electrical current a vibration between and engine and a generator. While the coupling provides indication of a need for stabilization of a connecting shaft between an engine and a generator, it is presented in a horizontal shaft and does not form the component operation or orientation of the present shaft coupling arrangement of the present system.

II. SUMMARY OF THE INVENTION

Lawn and garden tractors provide an owner and operator with the ability to tend to a yard or property with the operator being seated upon the tractor to perform certain maintenance tasks in keeping up their property. These lawn and garden tractors are smaller than typical agricultural tractors which allow for larger scale horticulture. In keeping a consistency within the present system intent, reference and distinction is being made as to applicability in the following manner. The present system application is not intended for application to the typical agricultural tractors used by farmers to pull plows, discs, powered farm equipment operating under a tractor supplied PTO (power take off) system or other farm implement. The applicable tractor primarily intended for use with the present system is the lawn and garden tractor used for residential or commercial lawn and garden maintenance, which typically may use small lawn and garden implements and are typically presented with a vertical rotary shaft within a vertically operated motor either in front of or behind the seat upon which the operator operates the lawn and garden tractor. For purposes of definition and brevity, the referenced tractors herein will be called lawn tractors.

These lawn tractors are used to mow lawns, to tow small accessory items, operate light use lawn and garden appliances including small trailers, rotary tillers, seed planters, small sprayers, mulching devices, and spreaders. Lawn tractors, while having components that involve D/C electrical systems and perhaps even some degree of low voltage A/C uses, do not provide for on-board supply of household A/C current to operate 110 or 220 volt tools as part of the lawn tractor utility. The present system provides an A/C generator system which is installed either as original equipment or as an aftermarket addition to a lawn tractor having a vertical shaft driven motor. More preferably, the system is best suited for a rear mounted vertical rotary engine, included on zero turn radius (ZTR) mowers, although contemplated for use with further modification to a front mounted vertical rotary engine.

The present auxiliary generator system is supported by an elevated frame and installs to the crankshaft of the vertical rotary engine on the lawn tractor, providing rotational drive to a vertically mounted electrical generator using the drive shaft of the rotary engine to compel the rotation of the generator shaft without impediment to the operation of the lawn tractor, and providing a plurality of 110 volt and/or at least one 220 volt outlet to be utilized by electrical equipment, including electrical lawn tools, power tools and light use welders, especially were there is no other local electrical source.

III. DESCRIPTION OF THE DRAWINGS

The following drawings are submitted with this utility patent application.

IV. DESCRIPTION OF THE PREFERRED EMBODIMENT

Figure 1:
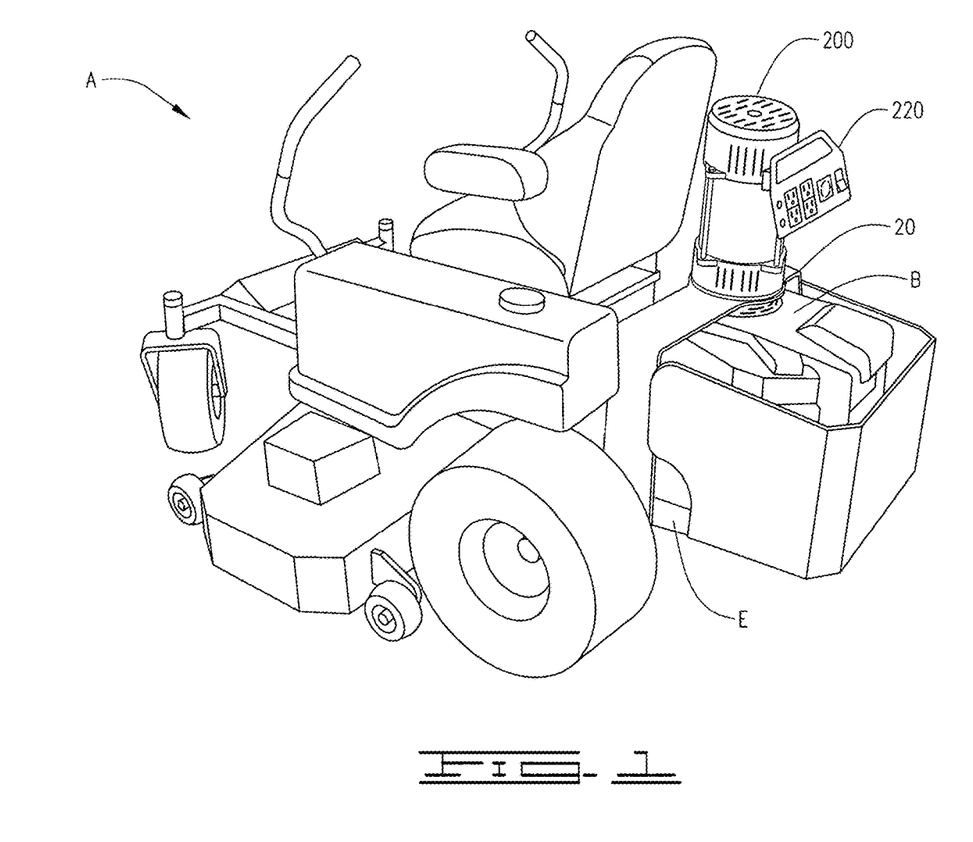
FIG. 1 is a view of a lawn tractor with the auxiliary A/C power generator mounted upon the lawn tractor above the engine.

An auxiliary A/C generator system 10 installs upon a lawn tractor A above the motor B of the lawn tractor A, shown in FIG. 1 of the drawings, providing an A/C electrical power supply in a plurality of A/C power outlets. The generator system 10 comprises a vertically oriented electrical generator assembly 200 upon which an A/C power panel 220 is attached, a lower bearing plate 150, an upper bearing shaft assembly 100 attaching an upper transfer gear 120, a lower camshaft assembly 50 attaching a lower transfer gear 70, a transfer gear bushing 140, and a lawn tractor deck mounting frame 20.

Figure 2A:
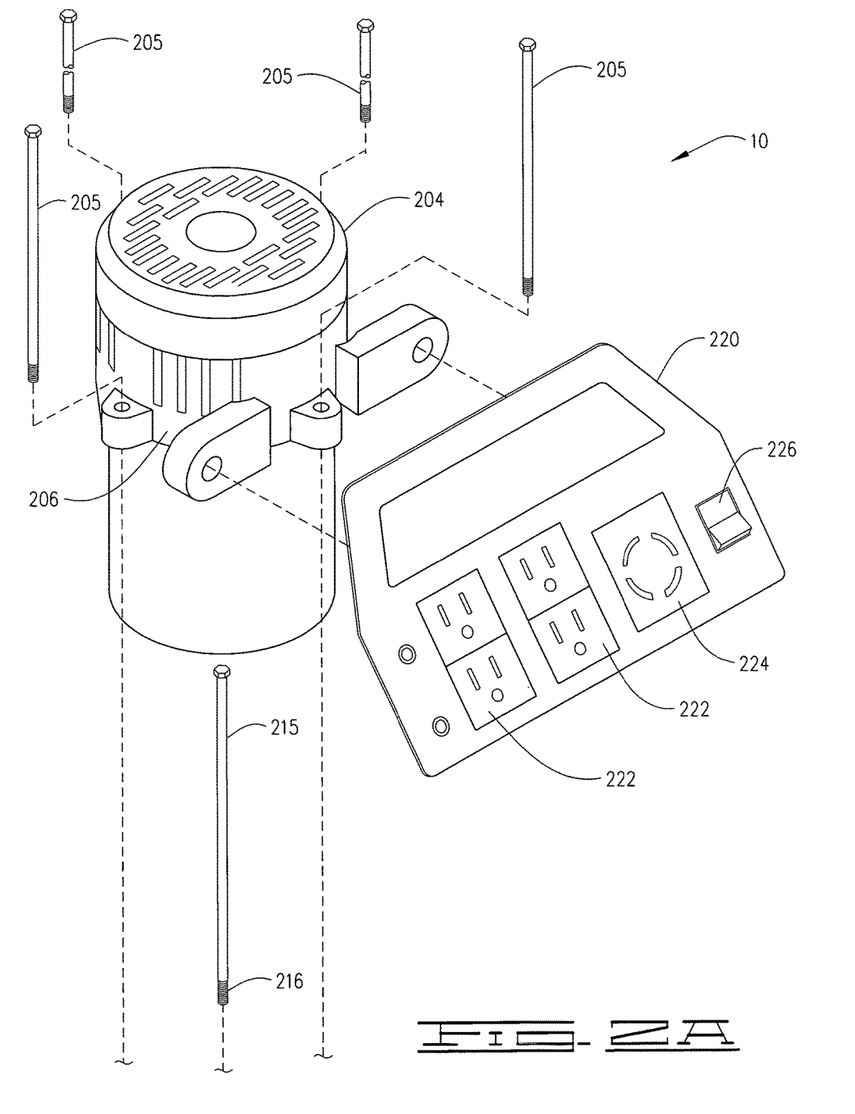
FIGS. 2A-2D are exploded view of the auxiliary A/C power generator, including the deck mounting frame.
Figure 2B:
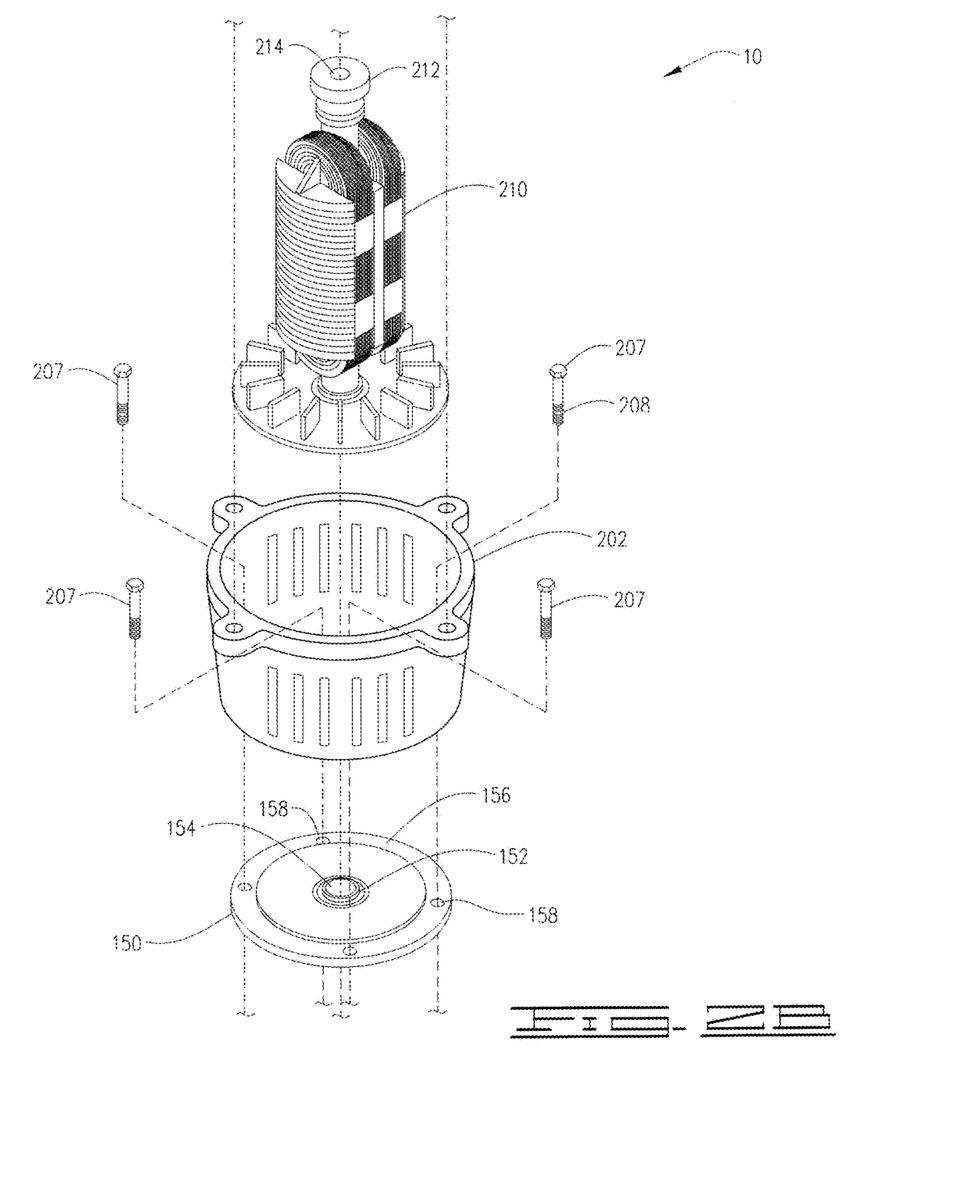
Figure 2C:
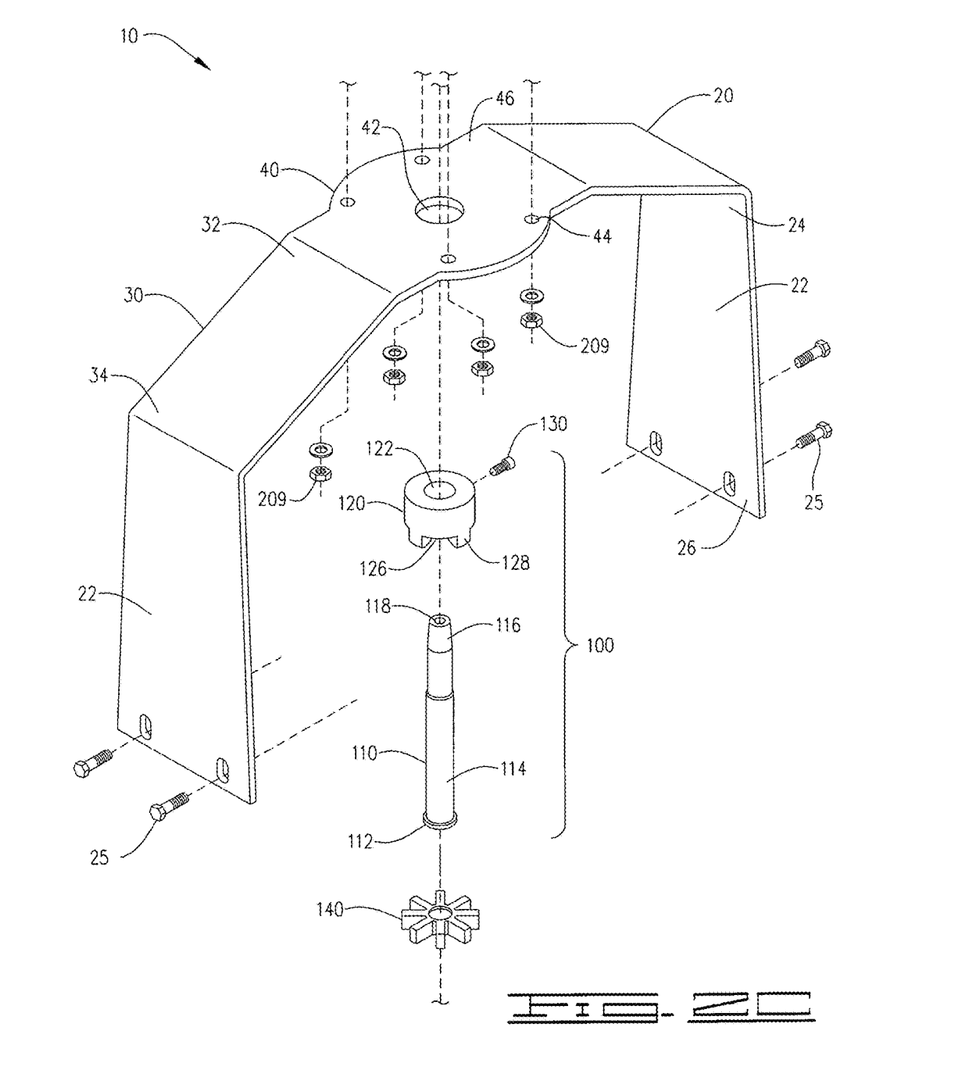

The C-shaped deck mounting frame 20 defines two vertical support struts 22, each vertical support strut having an upper end 24 and lower end 26 attaching to the lawn tractor deck E by at least two threaded bolts 25, an angular arch member 30 defining an inner end 32 and an outer end 34 extending from the upper end 24 of a respective vertical support strut 22, and a flat bearing platform 40 connecting respective inner ends 32 of each angular arch member 30, as shown in FIG. 2C. The flat bearing platform 40 defines a central shaft bore 42 and mounting holes 44 to secure the electrical generator assembly 200 and lower bearing plate 150 on an upper surface 46 of the flat bearing platform 40 by a plurality of nuts 209 and bolts 207, FIGS. 2B-2C.

Figure 2D:
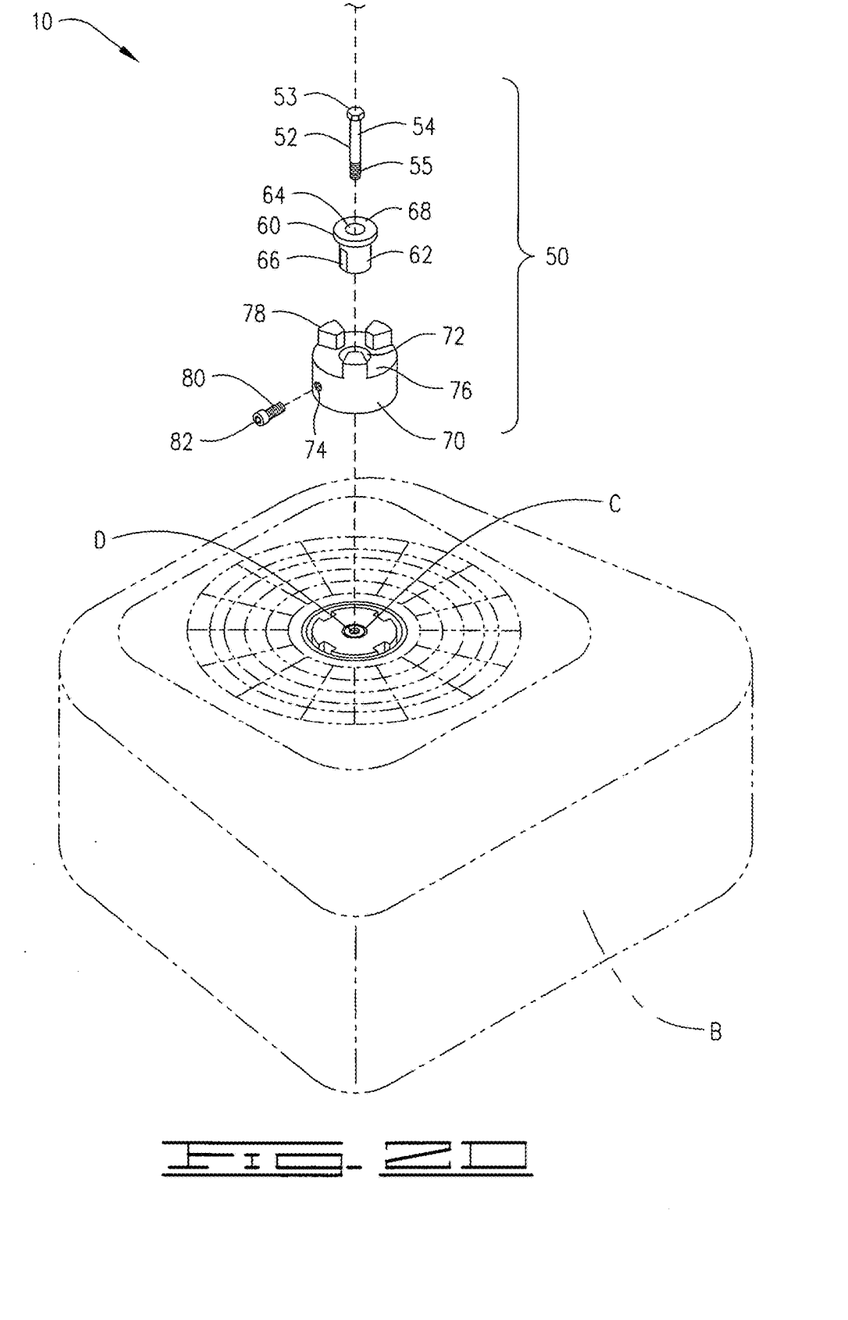
Figure 3:
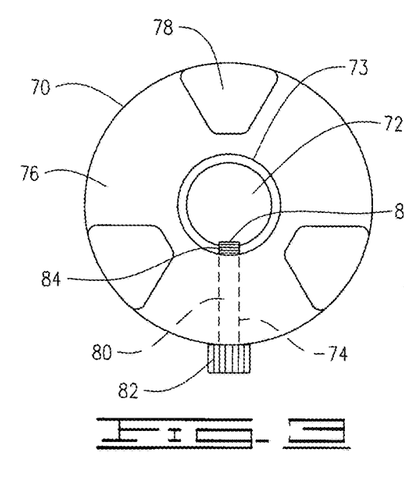
FIG. 3 is a top view of the lower transfer gear.

The lower camshaft assembly 50, shown in FIG. 2D, comprises a camshaft bolt 52 defining a head 53, a shaft 54 and a lower threaded end 55, the camshaft bolt 50 replacing a factory camshaft bolt provided at the top of the lawn tractor motor B, the lower threaded end 55 of the camshaft bolt 52 fitted within an inner threaded bore D in the camshaft C of the motor B. Modification may be required to a cowling above the motor camshaft C in order to gain access and provide rotational leeway for the lower transfer gear 70 during operation, which may partially intrude into the motor B of the law tractor A. The lower camshaft assembly 50 further defines the lower transfer gear 70 and a lower transfer gear insert 60. The lower transfer gear insert 60 forms a cylindrical body 62 having a vertical bore 64, an external flat portion 66 formed within the cylindrical body 62, an upper expanded insert ring 68, FIG. 2D. The lower transfer gear 70 further defines a gear insert aperture 72, a lower rim 73 partially extending within the gear insert aperture 72 and a lateral horizontal threaded bore 74 having an insert retaining screw 80, the insert retaining screw 80 defining a head 82, a threaded shaft 84 and a tip 86, the threaded shaft 84 engaging the lateral horizontal threaded bore 74 with the tip 86 of the insert retaining screw 80, FIG. 3, engaging the external flat portion 66 of the lower gear insert 60 within the gear aperture 72 of the lower transfer gear 70 to secure the lower transfer gear insert 60 within the lower transfer gear 70, FIG. 2D. It is intended that the lower rim 73 of the transfer gear 70 capture the expanded insert ring 68 of the lower transfer gear insert 60 to ensure that the transfer gear insert 60 does not extend below the lower transfer gear 70. The camshaft bolt 52 is inserted through the vertical bore 64 of the lower transfer gear insert 60, attaching the entire lower camshaft assembly 50 to the camshaft C of the lawn tractor motor B. The lower transfer gear 70 further defines an upper surface 76 extending a plurality of upward spaced sprocket teeth 78, as shown in both FIGS. 2D and 3.

Figure 4:
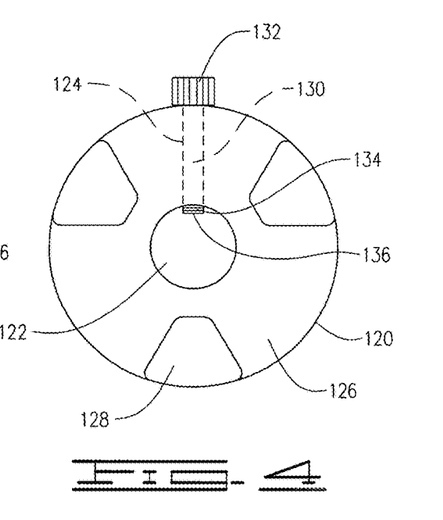
FIG. 4 is a bottom view of the upper transfer gear.
Figures 5, 6:
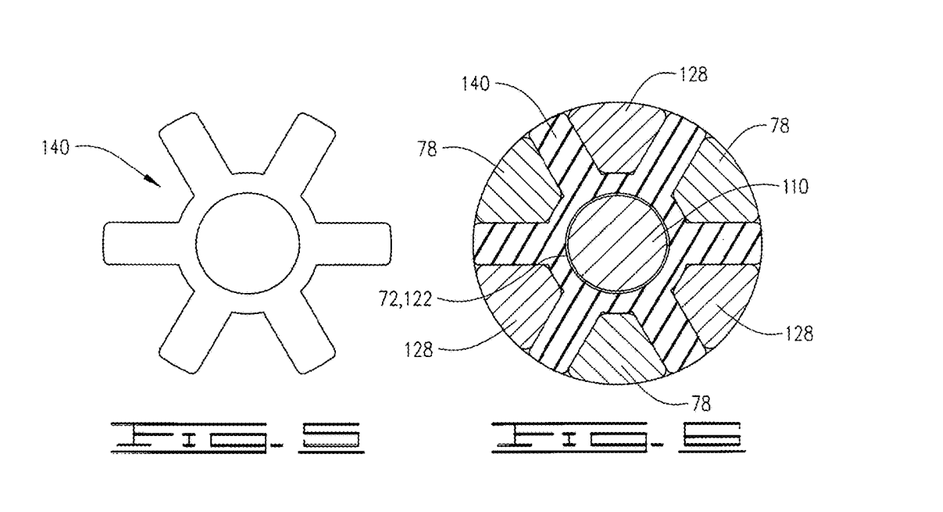
FIG. 5 is a top view of the transfer gear bushing.
FIG. 6 is a sectional view of the upper transfer gear, lower transfer gear and transfer gear bushing as assembled upon installation.

The upper bearing shaft assembly 100, FIG. 2C, defines a cylindrical bearing shaft 110 providing a lower flared end 112, a bearing shaft extension 114, and an upper tapered end 116 defining an inner threaded opening 118 and the upper transfer gear 120 defining a central vertical bore 122, a lateral threaded bore 124 and a lower surface 126 depending a plurality of lowered spaced sprocket teeth 128. The central vertical bore 122 of the upper transfer gear 120 engages the lower flared end 112 upon insertion and is retained upon the bearing shaft 110 by the tightening of a shaft retaining screw 130, FIG. 4, defining a head 132, a threaded shaft 134 and a tip 136, the shaft retaining screw tightened within the lateral threaded bore 124 of the upper transfer gear 120, the tip 136 of the retaining screw 130 encroaching within the central vertical bore 122, forcibly securing the upper transfer gear 120 upon the cylindrical bearing shaft 110. The bearing shaft extension 114 is further forced through a central opening 154 in a central bearing 152 within the lower bearing plate 150, FIG. 2C, with the bearing shaft extension 114 in such close tolerance to the bearing shaft extension 114, to an extent requiring use of a bearing press or a hammer applied to the lower flared end 112 of the cylindrical bearing shaft 110 for installation. Once the lower bearing plate 150 is located upon the flat bearing platform 40 of the deck mounting frame 20, the cylindrical bearing shaft 110 suspends the lowered spaced sprocket teeth 128 in a downward direction. Subsequently, the lower spaced sprocket teeth 128 of the upper bearing shaft assembly 100 are engaged with the upward spaced sprocket teeth 78 of the lower camshaft assembly 50, with the formed transfer gear bushing 140, FIG. 5, inserted between the respective upward spaced sprocket teeth 78 and lowered spaced sprocket teeth 128, as shown in FIG. 6. The transfer gear bushing 140 provides for a secure fit between the sprocket teeth, and also to provide a damper to vibration as the upper and lower transfer gears 70, 120, rotate at high speed during operation.

The electrical generator assembly 200 further comprises a lower housing 202 through which a plurality of attaching bolts 207 anchor the lower housing 202 through a plurality of aligned holes 158 within the outer perimeter 156 the lower bearing plate 150, and further through the mounting holes 44 of the flat bearing plate 40, each lower bearing plate attaching bolt 207 respectively secured by its outer threaded lower end 208 attaching nuts 209, FIGS. 2A-2C. A rotor 210 within the electrical generator assembly 200 attaches to the upper tapered end 116 of the cylindrical bearing shaft 110 by a rotor bolt 215, FIG. 2A, the rotor bolt 215 defining a lower threaded end 216, the lower threaded end engaging the inner threaded opening 118 within the upper tapered end 116 through a longitudinal bore 214 within an upper end 212 of the rotor 210, directly connecting the rotor 210 to the cylindrical bearing shaft 110. An upper housing 204, joins to the lower housing 202 by a plurality of housing attachment bolts 205, fully encasing the rotor 210 within the upper and lower housings 204, 202. The electrical generator assembly 200 produces an alternating electrical current, which is diverted to the A/C power panel 220 attaching to an outer surface 206 of the upper housing 204, to which the generated A/C electric current is diverted to provide A/C electrical current to the plurality of A/C power outlets, FIG. 2A. The electrical generator assembly 200 operates in the same manner as A/C generators known in the art, with the primary components being the rotor 210 and the stator located within the housings, with the exception of the present rotor 210 rotatably compelled by the camshaft C of the motor B of the lawn tractor A from below using the other components involved in the auxiliary A/C generator system 10.

Subsequent to full assembly, the rotating components of the auxiliary A/C generator system 10 during operation, turn with the same rotation and torque of the camshaft C of the motor B on the lawn tractor A. Those rotating components include the lower camshaft assembly 50, the upper bearing shaft assembly 100, the central bearing 152 (with the remainder of the lower bearing plate 150 remaining stationary), the rotor 210 and the rotor bolt 215. Those components which remain stationary during operation of the auxiliary A/C generating system 10 include the lower bearing plate 150 (with the central bearing 152 rotating), the deck mounting frame 20, the upper and lower housings 204, 202 of the electrical generator assembly 200, and the A/C power panel 220.

By using the lawn tractor motor B, the electrical generator assembly 200 has the capacity to produce A/C electrical current of 5500 amps or more, depending upon the rpm of the motor, the horsepower of the motor and the electrical generator output qualities and efficiency, providing the power panel 220 with a capacity to supply up to four 110 volt outlets 222 and at least one 220 volt outlet 224. An optional power switch 226 may also be provided on the power panel 220 to engage or disengage the supplied current to the outlets 222, 224.

While the auxiliary A/C generator system 10 has been particularly shown and described with reference to a preferred embodiment thereof, it will be understood by those skilled in the art that changes in form and detail may be made therein without departing from the spirit and scope of the invention.

What is claimed is:

1. An auxiliary A/C generator system installs upon a lawn tractor above the motor of the lawn tractor, providing an A/C electrical power supply in a plurality of A/C power outlets, said auxiliary A/C generator system comprising:
    a deck mounting frame attaching to a deck of said lawn tractor elevating a flat bearing platform having a central shaft bore above said motor of said lawn tractor;
    a lower camshaft assembly attaching to a camshaft of said motor of said lawn tractor defining a camshaft bolt supporting a lower transfer gear defining an upper surface presenting a plurality of upward extending sprocket teeth, said camshaft bolt attaching to a camshaft of said motor of said lawn tractor;
    an upper bearing shaft assembly defining a cylindrical bearing shaft suspending a central vertical bore of an upper transfer gear defining a plurality of depending sprocket teeth, said cylindrical bearing shaft further defining a bearing shaft extension and an upper tapered end providing an inner threaded opening;
    a transfer gear bushing fitted between said sprocket teeth of said lower transfer gear and said sprocket teeth of said upper transfer gear providing a secure fit between said sprocket teeth when said upper and lower transfer gears are engaged;
    a lower bearing plate defining a central bearing having a bearing opening tightly secured upon said bearing shaft extension, with said lower bearing plate further defining an outer perimeter;
    an electrical generator assembly defining an upper and lower housing, said lower housing attaching to said flat bearing platform of said deck mounting frame by a plurality of bearing plate attaching bolts through a plurality of aligned holes in said perimeter of said lower bearing plate, maintaining said lower housing and said outer perimeter stationary upon said lower bearing plate, said electrical generator assembly further defining a rotor within said electrical generator which is attached to said upper tapered end of said cylindrical bearing shaft by a rotor bolt; and
    a power panel attached to an outer surface of said electrical generator assembly providing a plurality of A/C electrical outlets, wherein said lower camshaft assembly rotates with said camshaft of said motor of said garden tractor, rotating said lower camshaft assembly, said upper transfer gear, said cylindrical bearing shaft with said central bearing of said lower bearing plate, further rotating said rotor within said electrical generator assembly to produce an A/C electrical current to said A/C electrical outlets in said power panel providing said lawn tractor with a useable A/C power supply.

2. The auxiliary A/C generator system, as defined in claim 1, said deck mounting frame further comprising:
    a C-shaped assembly defining two vertical support struts extending arch members attaching to said flat bearing plate, said vertical support struts attaching to said lawn tractor deck by at least two bolts and nuts per strut.

3. The auxiliary A/C generator system, as defined in claim 1, said lower camshaft assembly further defining:
    said camshaft bolt replacing a factory camshaft bolt provided within said motor of said lawn tractor motor within an inner threaded bore of said camshaft of said motor;
    a lower transfer gear insert defining a cylindrical body having a vertical bore, an external flat portion formed within said cylindrical body, and an upper expanded insert ring;
    said lower transfer gear further defining a gear insert aperture, a lower rim partially extending within said gear insert aperture and a lateral horizontal threaded bore having an insert retaining screw defining a head, a threaded shaft and a tip, said threaded shaft engaging said lateral horizontal threaded bore with said tip of said insert retaining screw engaging said external flat portion of said lower gear insert within said gear aperture of said lower transfer gear to secure said lower transfer gear insert within the lower transfer gear while said lower rim of said transfer gear captures said expanded insert ring of said lower transfer gear insert to ensure that said transfer gear insert does not extend below said lower transfer gear; and
    said camshaft bolt inserted through said vertical bore of said lower transfer gear insert, attaching said entire lower camshaft assembly to said camshaft of said lawn tractor motor.

4. The auxiliary A/C generator system, as defined in claim 1, said upper bearing shaft assembly further defining:
    said cylindrical bearing shaft providing a lower flared end, said central vertical bore of said upper transfer gear retained upon said lower flared end upon insertion from below, retained upon said bearing shaft by tightening a shaft retaining screw defining a head, a threaded shaft and a tip, said shaft retaining screw tightened within a lateral threaded bore of the upper transfer gear, said tip of said retaining screw encroaching within said central vertical bore, forcibly securing said upper transfer gear upon said cylindrical bearing shaft; and said transfer gear bushing being contoured and shaped to provide a secure fit between said sprocket teeth, and also to provide a damper to vibration as said upper and lower transfer gears rotate at high speed during operation.

5. The auxiliary A/C generator system, as defined in claim 1, wherein during operation, said rotating components of said auxiliary A/C generator system, said lower camshaft assembly, said upper bearing shaft assembly, said central bearing, said rotor and said rotor bolt rotate with the same rotation and torque of said camshaft of said motor on said lawn tractor while said lower bearing plate, said deck mounting frame, said upper and lower housings of said electrical generator assembly, and said A/C power panel, remain stationary.

6. The auxiliary A/C generator system, as defined in claim 1, further comprising:
   said electrical generator assembly producing up to 5500 amps of electrical current; and
   said power panel providing a power switch to engage and disengage supplied current to said power panel and said power panel providing a plurality of 110 volt A/C outlets and at least on 220 volt A/C outlet.

* * * * *